Figure 1:
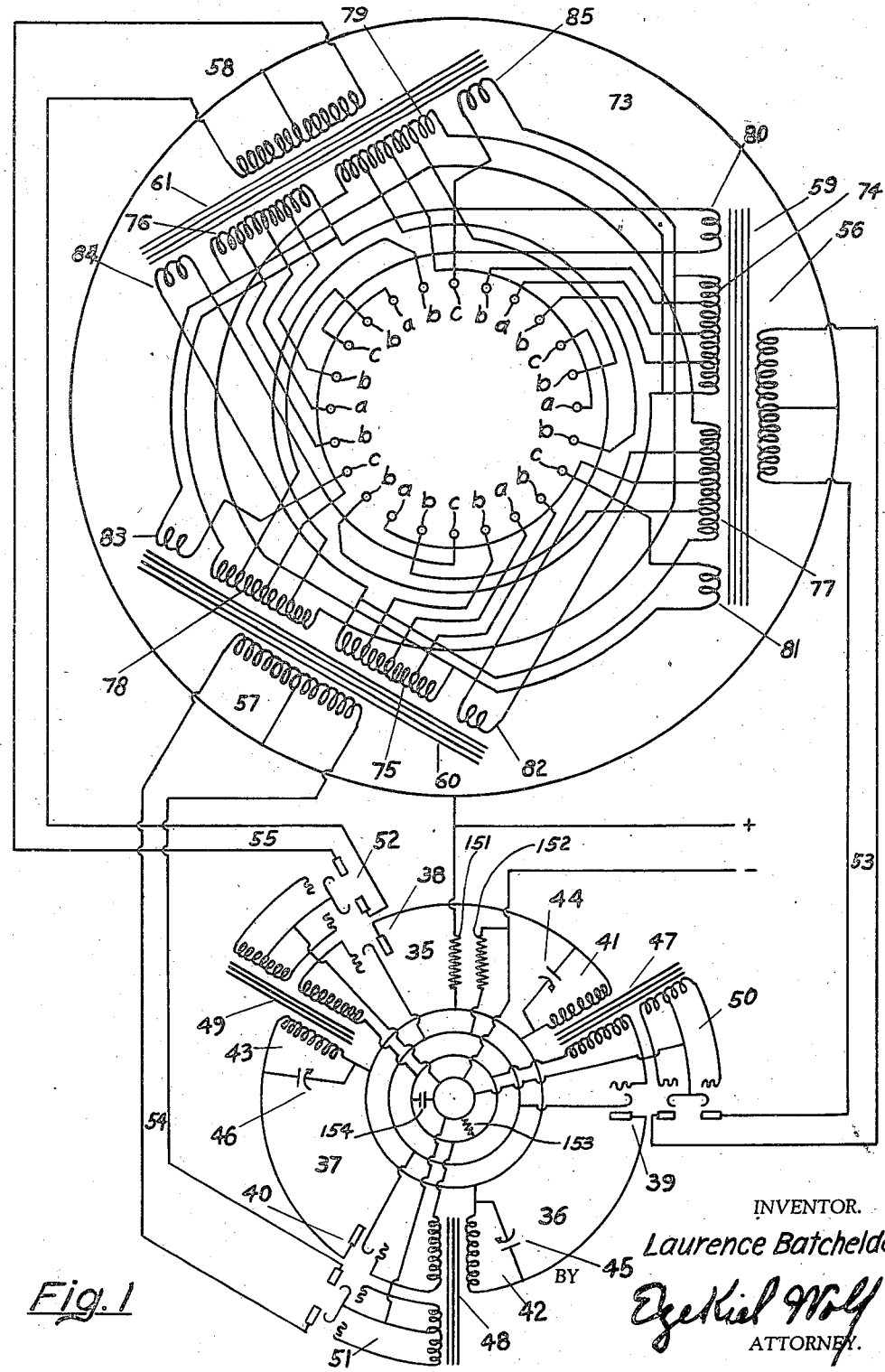

Sept. 10, 1946.　　　L. BATCHELDER　　　2,407,242
ELECTRICAL APPARATUS
Filed April 1, 1933　　　8 Sheets-Sheet 1

INVENTOR.
Laurence Batchelder
BY Ezekiel Wolf
ATTORNEY.

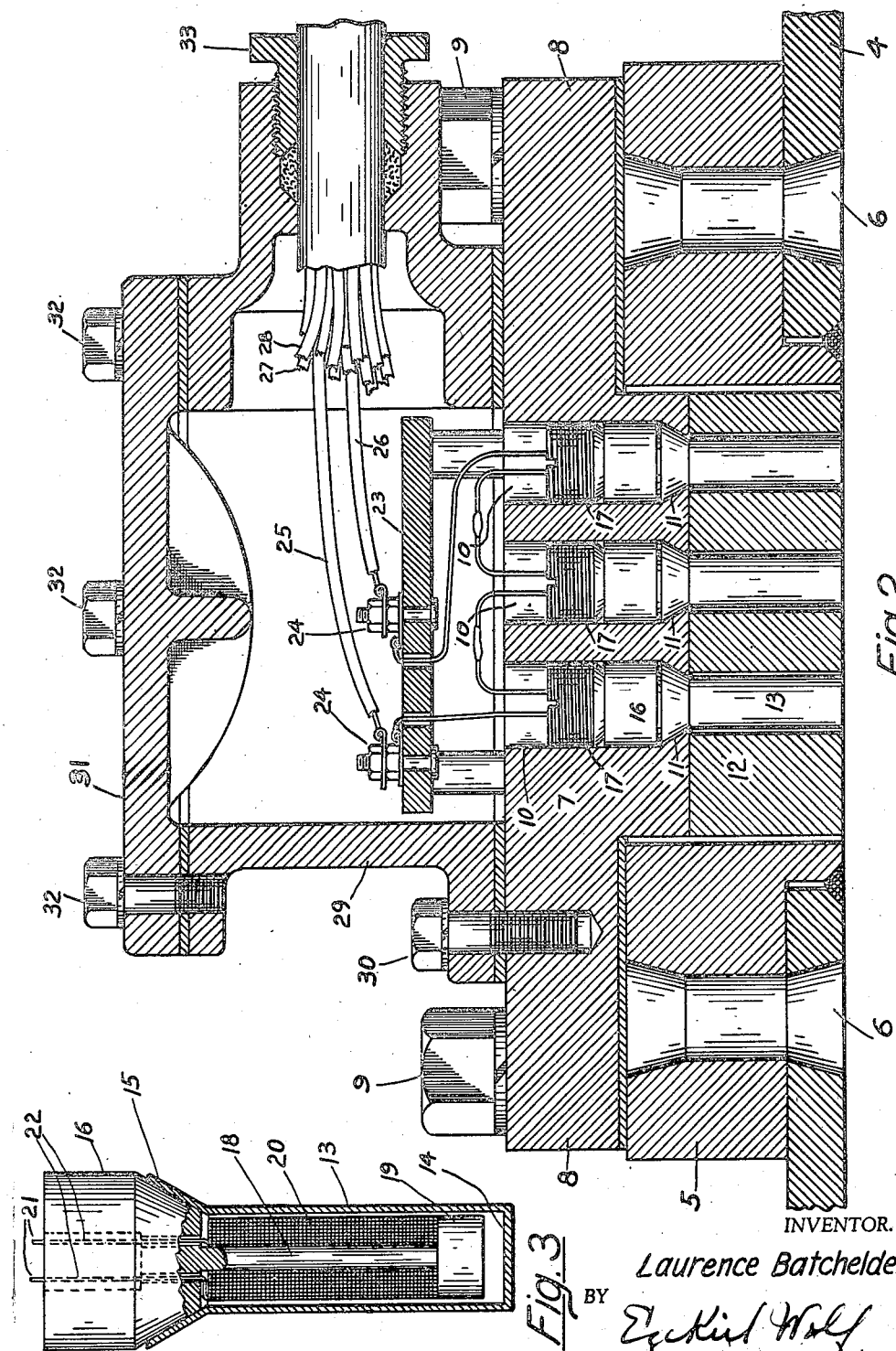

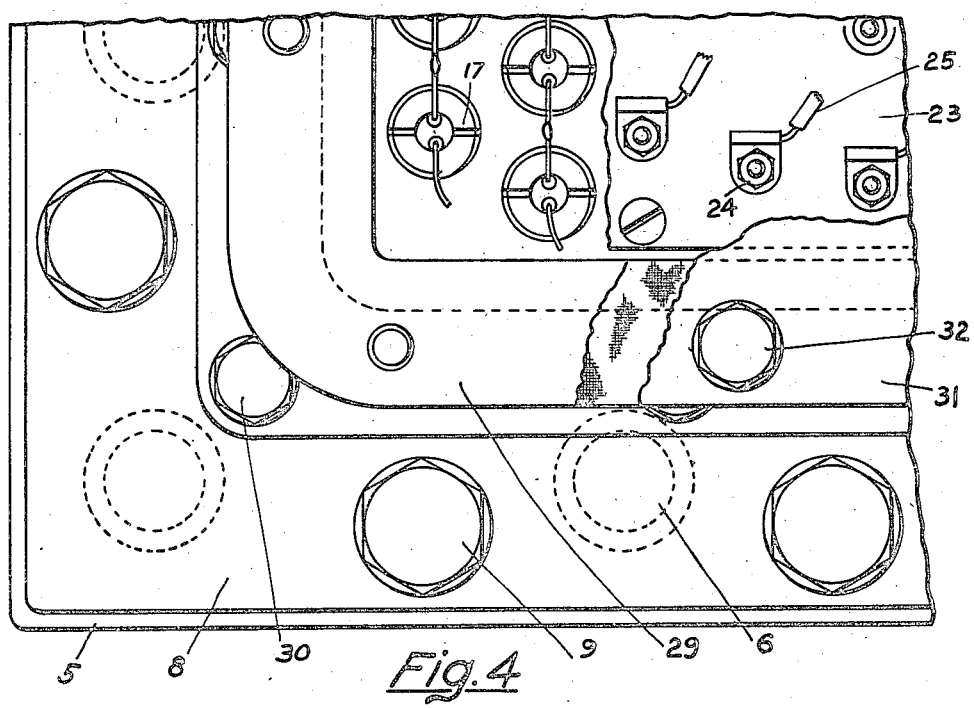
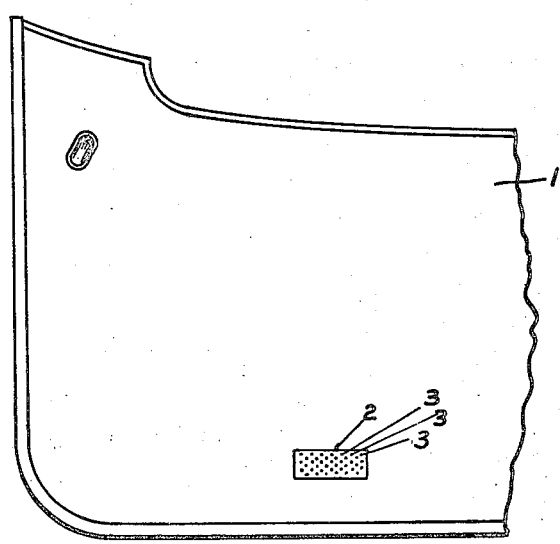

Sept. 10, 1946.    L. BATCHELDER    2,407,242
ELECTRICAL APPARATUS
Filed April 1, 1933    8 Sheets-Sheet 4

INVENTOR.
Laurence Batchelder
BY
ATTORNEY.

INVENTOR.
Laurence Batchelder

Sept. 10, 1946.    L. BATCHELDER    2,407,242
ELECTRICAL APPARATUS
Filed April 1, 1933    8 Sheets-Sheet 6
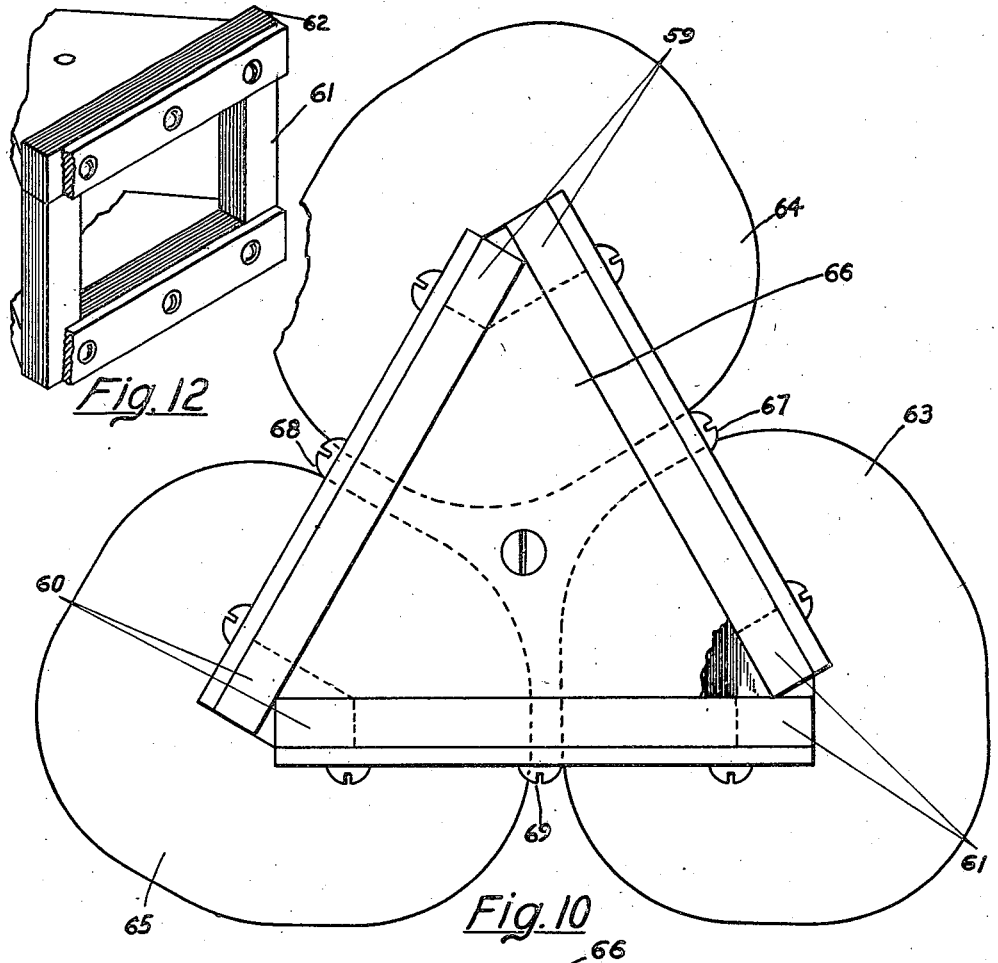
Fig. 12
Fig. 10
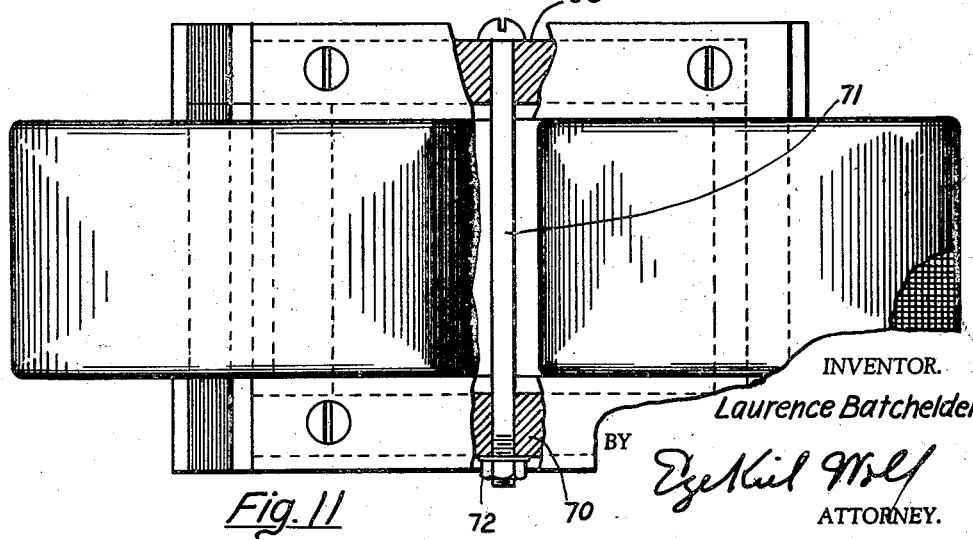
Fig. 11
INVENTOR.
Laurence Batchelder
BY
ATTORNEY.

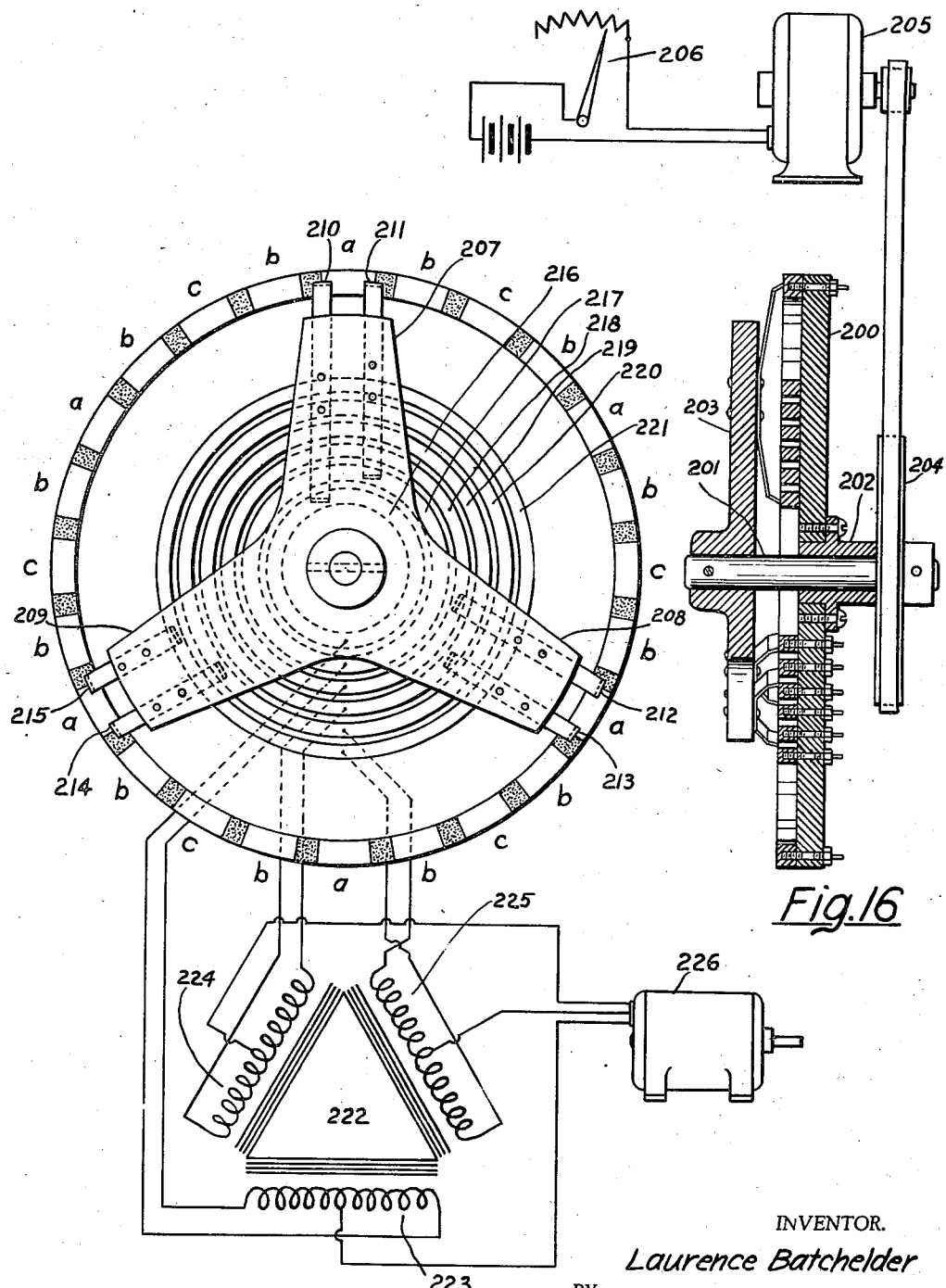

Patented Sept. 10, 1946

2,407,242

UNITED STATES PATENT OFFICE 2,407,242

ELECTRICAL APPARATUS

Laurence Batchelder, Cambridge, Mass., assignor, by mesne assignments, to Submarine Signal Company, Boston, Mass., a corporation of Delaware Application April 1, 1933, Serial No. 663,963

10 Claims. (Cl. 177—386)

The present invention relates to a system for producing a beam of radiated energy whose direction can be controlled, and more in particular to such a beam in which the energy radiated is in the form of compressional waves either of sonic or frequencies above the audible range.

Systems have already been devised in which beams of radiated energy are emitted and means also has been devised for controlling the direction of such beams. Two general methods have been employed. In one method the source itself is turned in the direction in which it is desired to project the beam. In the other method when it is desired to turn the beam a certain amount of retardation of the wave energy is given to successive units of the system so that the energies emitted by successive sources lag behind one another by a given amount. Such a system is described in the Hayes et al. United States Patent No. 1,636,510 and in this system it will be noted that a group of sound transmitters arranged along a straight line at a definite spacing is excited by an electrical oscillatory source through retardation means which makes successive transmitters along the line lag in the production of the sound energy a given amount behind the adjacent source.

As contrasted with this system in the present system the energy from the electrical source to the transmitter is not delayed but it is created or generated in a different phase in such a manner that at the transmitting end the same wave pattern is produced in the propagated wave as would be produced in the system just previously described. The present invention may, therefore, be called the "phase method" as contrasted with the prior system which may be called the "retardation method."

In the present invention no retardation is used between the generating unit and the transmitting sources. In addition to this the present system can be applied to the propagation and projection of waves of any frequency and is particularly adaptable to the projection of compressional waves in the range above audibility where the wave lengths are extremely short and where it is practically impossible to design an efficient retardation system.

In my complete system I have devised a transmitting source in which each unit is substantially a point source of radiation. These units are preferably spaced apart in the system at distances not greater than one-half wave length of the energy transmitted in the propagating medium. Each individual source or group of sources may go to form a unit in which the phase of the energy is the same. The individual units have different phases which are supplied from a multiphase generator which has been especially designed for this system. A switching arrangement is also provided for successively applying the various phases generated to the various sources so as to give the beam of energy a swing corresponding to the rotation of the switch.

Figure 6:
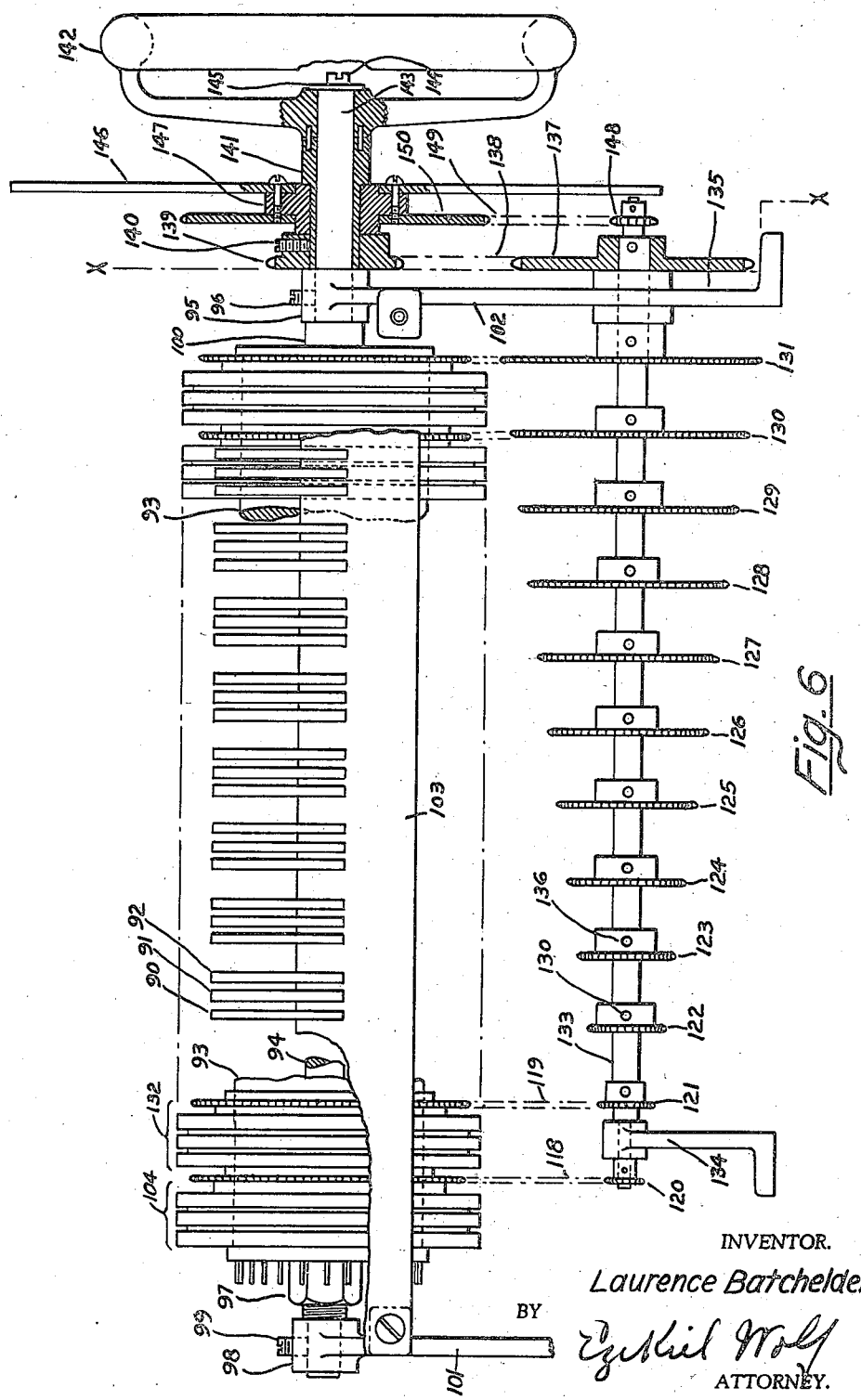
Figure 8:
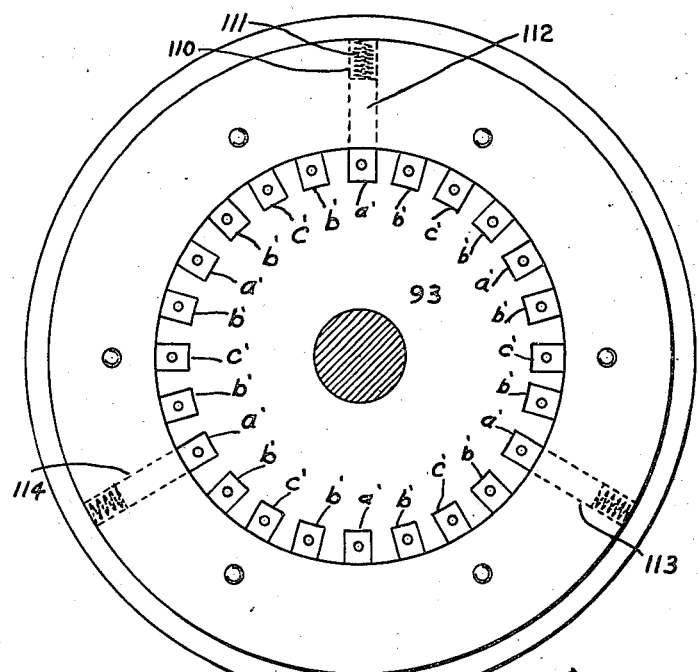
Figure 9:
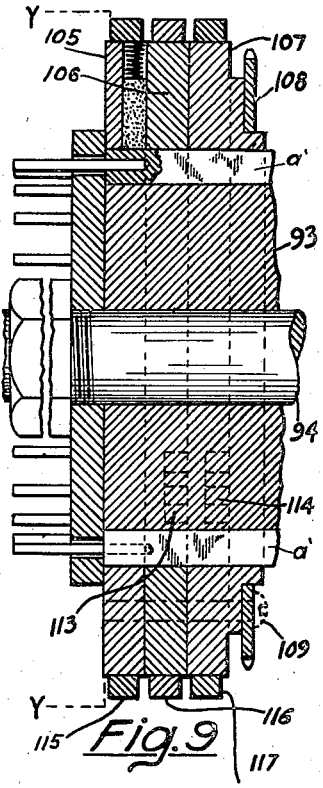
Figure 7:
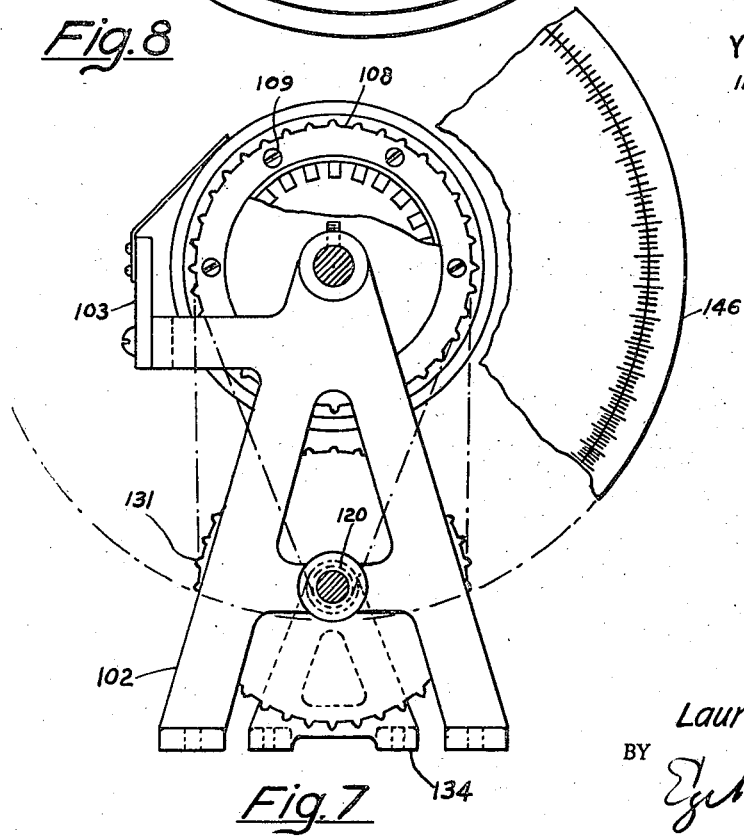
Figure 13:
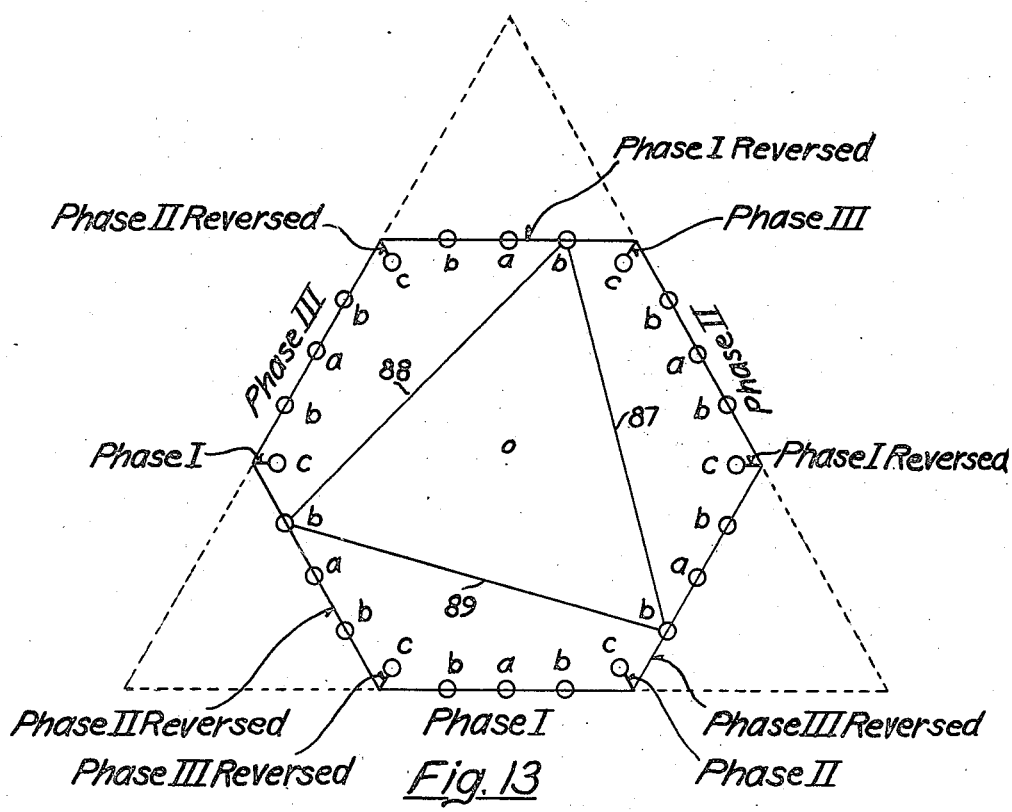
Figure 14:
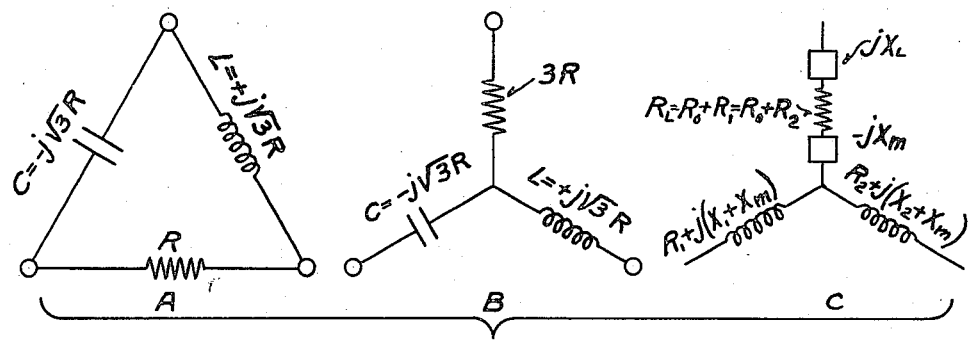

Without describing in further detail the advantages and objects of the present system the invention will be described in connection with the drawings showing an embodiment of the same in which Fig. 1 shows a schematic wiring diagram of the system; Fig. 2 shows a section of the sound or supersonic transmitter; Fig. 3 shows a detail; Fig. 4 shows a further detail of the transmitter showing a part top view looking down on the section shown in Fig. 2; Fig. 5 shows the position of the unit on a vessel; Fig. 6 shows a part side view of the switch used in the invention; Fig. 7 shows an end view looking from the right to left in Fig. 6 with a part of the scale broken away; Fig. 8 shows a detail of the switch; Fig. 9 shows an enlarged end view in section of a part shown in Fig. 6; Fig. 10 shows a transformer used in the generating system; Fig. 11 shows an end view partly in section of Fig. 10; Fig. 12 shows in perspective one section of the transformer; Fig. 13 shows schematically the phase circuit; Fig. 14 shows the development of the conversion of the load circuit; Fig. 15 shows a modification of the apparatus as applied for starting electrical apparatus such as a synchronous motor and controlling the speed and Figure 16 shows a sectional view of the switch in Fig. 15 and means for operating it.

The sound transmitter, as indicated in Fig. 5, mounted in the vessel 1 in a position somewhat near the bow and located below the water line on the hull is an elongated structure 2 running in a horizontal direction and comprising a plurality of sound or supersonic sources 3, 3, 3. These may be staggered as shown in Fig. 5 and may have any desirable arrangement in a plane forming, if desired, a circle or ellipse or other figure. This structure is shown in greater detail in Figs. 2, 3 and 4. In Fig. 2 the skin of the vessel is shown as 4 to which a heavy plate 5 may be attached by means of the rivets 6, the heavy plate 5 furnishing a seat for the sound or supersonic transmitter. The supersonic transmitter comprises a heavy plate 7 having outwardly projecting flanges 8 through which by means of the bolts 9 the oscillator is bolted to the heavy rim 5. In the central portion of the plate 7 are a group of perforations 10, 10, 10 having at the lower portion a bevelled or conical wall as indicated by 11, 11, 11 in Fig. 2.

The plate 7 may be constructed to extend to the surface of the vessel 4 but as indicated in Figure 2 it is faced at the front by a hard rubber piece 12 which is fastened to the plate 7 in any suitable manner and which forms at its front surface a continuous surface with the skin of the vessel. In the perforations in the plate 7 and the element 12 are positioned the units shown in section in Fig. 3. Each of these units comprises a magneto-strictive tube 13 having a head 14 mounted on the end thereof. The tube 13 is fastened in the plate 7 in any suitable manner, but preferably, as indicated in the present construction, has a flared end 15 fitting in the conical perforation 11 in the plate 7. This construction is highly desirable both from the point of view of manufacture and from technical results obtained. It provides a very rigid joint without the necessity of welding and makes it possible to tune each individual unit to the same frequency as well as providing a unit which can readily be disassembled and put together without changing its acoustic properties. A clamping member 16 having a conical shape of a slightly less taper than the end 15 of the tube fits into the end of the tube and is adapted to clamp the tube 13 firmly in the plate 7. This is accomplished by means of the threaded plug 17 which is threaded into the top of the plate 7 and drawn up tight to hold the tube 13 firmly in place. Within the tube 13 and formed as a piece of the clamping member is a core 18 at the end of which is a solid cylinder 19. Wound about the core 18 is a coil 20, the leads 21 of which are taken up through holes 22, 22 in the piece 16. The magnetic circuit for the coil 20 is thus formed through the core 18, the circular piece 19, the tube 13 and the base of the clamping element 16. The magnetic flux flows therefore lengthwise of the tube 13 and produces a longitudinal vibration of the tube and a vibration of the plate 14 carried at the end thereof. It is preferable in the present case to set the resonance frequency of the plate 14 above that of the tube 13. The tube 13 is preferably made one-quarter wave length of the wave produced in the material and the diameter of the plate 14 is preferably less than one-half wave length of the sound or compressional wave that is being propagated in the radiating medium.

As indicated in Fig. 2 the leads to the coils 20 are brought out to a terminal plate 23 on which the terminal connections 24, 24 are mounted. As indicated in Fig. 2 the three tubes spaced one above the other are connected together in series to the leads 25 and 26. The leads 25 and 26 furnish one phase for the system and all of the sources in the vertical line are energized in this same phase. Each line is operated with a different phase for which separate leads 27, 28, etc., are brought out to the phase switch shown more clearly in Figs. 6, 7, 8 and 9.

The plate 7 is covered by a frame 29 held to the plate by bolts 30 through a flange in the frame. The casing or frame 29 is covered over at the top with a plate 31 held by the bolts 32 indicated in Fig. 2. The conductors are brought through the side of the casing 29 with a proper stuffing box 33 as indicated in Fig. 2.

The generating circuit for generating the multiphase power is shown in Fig. 1. This comprises a group of similar tube circuits 35, 36 and 37 including the vacuum tubes 38, 39 and 40. The plate circuits of each of these tubes have tuned outputs 41, 42 and 43 which are tuned or adjustably tuned for a definite resonant frequency by means of the tuning condensers 44, 45 and 46. The output transformers 47, 48 and 49 have one secondary connected to the grid or control electrode of the next tube circuit, that is to say, the circuit 35 is coupled through its plate output to the grid of the circuit 36 and the circuit 36 is similarly coupled to the circuit 37 which is coupled again to the circuit 35.

It will be noted in the circuit that the resistor 151 serves to drop the anode voltage so that the same direct current supply can be used for the oscillator as for the amplifier about to be described. It should also be noted that the resistor 152 connected between the cathodes and the negative side of the line serves to produce a negative grid bias on the grid electrodes. The grid electrodes are also biased by the resistors 153 to produce a further negative bias on the grids. This resistor may be bypassed by a capacity 154 across it if the resistor is of a large magnitude. Resistor 153 serves to control the amplitude of oscillation since the bias voltage across it is proportional to the average grid current.

By properly adjusting the plate tuning in each of these three circuits maintaining each circuit similar to the other circuit, it is possible to set up a three-phase oscillation. I have found that these circuits may be made to oscillate to produce three phases or more in a number of different modes, the most stable condition apparently being a frequency of oscillation which is above the computed resonance in each plate circuit. In this type of circuit it will be noted that the feed back or regeneration to establish oscillation in the circuit is passed from the circuit 35 to circuit 36, from the circuit 36 to the circuit 37 and then back to the circuit 35, establishing therefore a complete circle of the energy setting up the oscillation in the system. I have found that in this system a true three-phase oscillation is set up in which each phase is 120 degrees out of phase with that in the preceding circuit. Since the oscillations are continuously circulatory in nature, the circuit might well be called a "merry-go-round" circuit and this designation appears to describe the type of oscillation quite vividly.

At lower frequencies a machine may be used to generate three phase power or it is also possible to use a single phase vacuum tube circuit with a split phase arrangement although I prefer to use the arrangement described above as providing very stable operation.

The secondary of each of the transformers 47, 48 and 49 control the amplifying circuits 50, 51 and 52 which, as indicated in Fig. 1, are preferably of the push-pull type or, namely, class B amplifiers in which the average plate current is substantially zero. The output of the amplifier circuits 50, 51 and 52 are connected by the leads 53, 54 and 55 to the balanced primaries of the power transformers 56, 57 and 58, respectively. Instead of using separate transformers for each phase there is an advantage in using a single three phase transformer which permits a transfer of energy between the phases. If there is an unbalance in the phases the present construction allows a transfer of energy to reduce this.

The construction of these power transformers is more clearly indicated in Figs. 10, 11 and 12. The power transformers 56, 57 and 58, as indicated in Figs. 10, 11 and 12, are constructed like the transformers 47, 48 and 49. The transformers 56, 57 and 58 have three substantially closed magnetic paths which are coupled in delta connection. As indicated in Fig. 10 the closed core 59 may be the core corresponding to the transformer 56, the core 60 corresponding to the transformer 57 and the core 61 corresponding to the transformer 58. As shown in Fig. 12 the closed core is substantially a rectangular frame made up of substantially U-shaped laminations 61' and straight strip laminations 62. For high frequencies it is necessary to use very fine laminations and therefore I have found it advisable not to lap the joints but simply to abut the joints as indicated in Fig. 12.

As shown in Fig. 10 the three rectangles are put together with the corner of one leg resting slightly inside of the corner of the leg before it. This construction makes the core for each coil 63, 64 and 65 somewhat odd in shape but no difficulty is found with winding the coil and assembling the unit. The whole unit may be held together by a Bakelite plate 66 fitting within the triangle formed by the top and bottom members of the individual frames to which the frames may be fastened by means of the screws 67, 68 and 69. The plate 66 and the plate 70 at the top and bottom of the unit may be held together by means of the stay bolt 71 and the nut 72.

The individual transformers 56, 57 and 58 actually are units in what may be called a polygon transformer 73 which will be understood more clearly perhaps in connection with the diagram shown in Fig. 13. The primaries of 56, 57 and 58 have three-phase voltage 120 degrees apart. The secondary of the polygon transformer 73 of which the so-called individual transformers are parts has three phases corresponding respectively to the three phases in the primary, namely the secondaries 74, 75 and 76. These are indicated in Fig. 13 as Phase I, Phase II and Phase III. The secondaries also have respectively the same three phases connected in reverse. These are indicated by the secondary 77, 78 and 79 and correspond to the sections marked Phase I Reversed, Phase II Reversed and Phase III Reversed. In addition to these secondaries there are six small secondaries 80, 81, 82, 83, 84, and 85, 86 corresponding to Phase I and indicated by the short line in the direction of Phase I between Phase II Reversed and Phase III, 81 corresponding to Phase I Reversed between Phase II and Phase III Reversed, and the other small secondaries corresponding to the inwardly directed lines marked Phase II, Phase III, Phase II Reversed and Phase III Reversed.

In Figure 13 is indicated a voltage vector diagram in which the lines forming the hexagon represent the voltages of each phase. As indicated in Fig. 1 each phase and each phase reversed is tapped at three places corresponding in the diagram in Fig. 13 to b, a, b, and each small secondary corresponding to the six c's. Each secondary connected to c has been chosen to produce an average voltage between the voltage from the center o to the points a and b but may be chosen, if desired, to lie on the circumference of the circle which is tangent to the sides of the regular polygon, or may be of any other convenient length.

It will be noted that the points, a, b and c lie substantially on the circle which is tangent to the sides of the regular polygon, and the phases of the load as indicated in Fig. 13 by the lines 87, 88 and 89 are equal and 120 degrees from one another, and always form an equilateral triangle with o as the center.

The multiphase transformer diagrammatically indicated in Figs. 1 and 13 is connected to the switch shown in Figs. 6, 7, 8 and 9, the taps a, b and c being connected to the conducting segments indicated by a', b', c' in Fig. 8. For each group of transmitters there are provided three switch segments 90, 91 and 92 corresponding to the connections indicated in Fig. 13 by the contacts of the triangle 87, 88 and 89 with the multiphase transformer.

Two geometrical properties of regular polygons enter into the design of the system. Consider any straight line lying in the plane of a regular polygon. The sum of the squares of the projections of the line on the sides of the polygon is equal to half the number of sides times the square of the length of the line. Conversely the sum of the squares of the projections of the sides of the polygon on the line is equal to half the number of sides times the square of one side. The line or the polygon may be rotated with respect to the other without altering the sum of the squares of the projections of either one on the other.

Referring to Fig. 13, the lines 87, 88 and 89 represent equal loads connected in delta across the system. These lines may conveniently be called load lines. The power transferred from any phase to any load is proportional to the square of the projection of the load line on the side of the polygon corresponding to that phase. Since the phases form a regular polygon, it is evident from the first geometrical theorem stated above that the total power supplied by all phases to any one load 87, 88 or 89 will be constant as the load line is rotated. (It is assumed that the length of the load line is constant in all positions.) Since the lines 87, 88, and 89 form an equilateral triangle, it is evident from the second theorem that the total power drawn from any one phase by all three loads is constant as the load lines are rotated.

The length of the load line determines the voltage impressed on the load. If the length is constant, the voltage is constant, and a simple relation exists between power and impedance. Under this circumstance, the impedance looking into the polygon transformer from either the generator or the load will be independent of the position of the delta load on the system. This result might have been shown directly from the geometrical properties of regular polygons, since in Fig. 13 the effective turns ratio is the projection of a load line on a phase, and the impedance transformation is the square of the turns ratio. The constancy of impedance in this phase shifting system is of the utmost importance both in transmission and reception of radiant energy.

As the load to each unit in the transmitter shown in Fig. 2 is indicated as single phase, it is necessary to convert the power drawn from the multiphase transformer as three phase to single phase. This is accomplished by means of a network to be described later. The switch shown in Figs. 6, 7, 8 and 9 comprises a drum 93 in the surface of which are set the segments a', b', c' already described. The drum 93 is supported by a shaft 94 which, as shown in the right end of Fig. 6, is held in the bearing 95 by means of the set screw 96. As shown at the left end of Fig. 6 the shaft 94 is threaded to receive the nut 97 and at its end rests in the bearing 98 held in place there by the set screw 99. The nut 97 holds the drum 93 firmly on the shaft 94 since at its right end a shoulder 100 is provided on the shaft against which the drum is pressed.

Extending from the supports 101 and 102 of the bearings is an electric insulating strip 103 upon which the brushes 90, 91 and 92 are fastened. Concentric with the drum and free to be rotated about it are the insulating shells 104 which may be of Bakelite or any other suitable material. The insulating shell 104 is made up of three rings 105, 106 and 107. Mounted on the ring 107 at the right in Fig. 9 on a shoulder cut in the ring is a sprocket wheel 108. The three rings 105, 106 and 107 may be held together by the same bolts 109 holding the sprocket ring to the shell. A groove 110 is cut in each of the three rings and in this groove is positioned by means of the spring 111 a brush 112 bearing against the segments of the drum. The dotted outlines 113 and 114 indicate, respectively, the brushes in the rings 106 and 107. Each brush is of such a width that it can rest only on one segment at a time. As will be seen from Fig. 8 these three brushes are placed apart on the circumference 120 degrees such that when the brush 112 bears on the segment $a'$, the brushes 113 and 114 also bear on the segments $a'$. A spacing slightly different from 120 degrees may be chosen to obtain successive switching of the three brushes on the segments. Under these conditions the phases will be at times slightly unbalanced but for some purposes this disadvantage would be outweighed by the smaller steps of phase shift obtained. At the outside of the rings 105, 106 and 107 are conductive slip rings 115, 116 and 117 against which the brushes 90, 91 and 92 bear, respectively. Each unit, as indicated on the drum, is constructed in the same fashion and each group has three brushes bearing upon the segments of the drum. The shells which are free to rotate about the drum are rotated by means of the sprocket wheels and the chains 118, 119, etc., which are driven from a second set of dissimilar sprocket wheels 120, 121, 122, 123, 124, 125, 126, 127, 128, 129, 130 and 131. The sprocket wheels 120 to 131, it will be noted, have their edges lying on a straight but inclined line.

For uniform spacing of the transmitting units the phase shift for each unit follows a simple arithmetic progression. For any other spacing the sprocket wheels must be chosen accordingly. In the present case each wheel has progressively more teeth by the same amount than the wheel of the next smaller size and the number of teeth of each of the wheels is a multiple of the number of teeth in the smallest wheel. Therefore, the section 132, indicated in Fig. 6, with the same rotation of the sprocket shaft 133 moves twice as far as the section 104 and therefore its brushes are advanced in phase double the phase that its predecessor is advanced. The shaft 133 is supported to move in the bearings 134 and 135 and all of the sprocket wheels 120 to 131 are pinned to the shaft by pins 136, 136, etc. The sprocket shaft 133 is driven by the sprocket wheel 137 through the chain 138 which, in turn, is operated by the sprocket 139 fixed by means of the set screw 140 firmly on the tube 141 bearing the handwheel 142. The tube 141 is free to move on the extended shoulder 143 of the shaft 94 and it is held in place upon the extension 143 by means of the screw 144 beneath which is a washer 145. As the handwheel 142 is turned, the sprocket 139 is rotated and thereby the sprocket 137 driving the sprocket shaft 133. Instead of the handwheel drive, as indicated by 142, a power drive may be used and this may be controlled remotely by means of a suitable electric motor as, for instance, a motor of the Selsyn type. The scale 146 mounted on the shell 147 is free to rotate on the tube 141 and may be driven by turning of the handwheel 142 through the operation of the sprocket wheel 137. A small sprocket wheel 148 is carried upon the shaft 133 for this purpose and when the shaft 133 turns, the sprocket 148 through the chain 149 turns the sprocket wheel 150 which, in turn, controls the rotation of the scale 146.

The scale is suitably calibrated as indicated in Fig. 7 and a fixed indicator is used supported on the frame or casing of the switch.

Each group of leads 90, 91 and 92 draws a three-phase power from the segments as indicated by the association of Figs. 8 and 13, and in the operation of the system each of these groups is advanced when using a uniform spacing of transmitters in accordance with an arithmetical progression. The system may also have a fixed group in which the phase is never shifted and the three leads for this group may be permanently connected to any suitable three segments of the drum.

In the present system each vertical group of units is operated in the same phase and therefore a single-phase power is desired. In order, however, to preserve a balance of the whole system I have found it essential to draw the power off the system as though it were a three-phase load and this has been accomplished by a proper load network as indicated in the development in Fig. 14 where A shows a delta load, B the corresponding Y load and C the actual design used in the present system. I have discovered that by a proper assignment of electrical constants to a network, as indicated in 14A, the phase of the load as viewed from all of the three phases is uniform, that is, the impedance looking outward is always the same. By proper calculation it can be shown that if the load across one phase is R, the loads across the other phases, respectively, are for C $$-j\sqrt{3R}$$

and for L $$+j\sqrt{3R}$$

This may be obtained by using as C a capacity whose reactance is $$-j\sqrt{3R}$$

and by an inductance whose reactance is $$+j\sqrt{3R}$$

where the load across the other phase is R. The corresponding Y arrangement for this system demands that the resistance shall be 3R in place of R.

With a magnetostriction oscillator which is an inductive load I have found that the same phases may be obtained by the use of a proper auto transformer. If an auto transformer is chosen in which the branches have self reactances of $x_1$ and $x_2$ respectively and mutual reactance of $x_m$ then the equivalent T network contains arms having reactances respectively of $$(x_1+x_m) \text{ and } (x_2+x_m)$$

and the staff reactance of $$-x_m$$

This is shown in 14C. The load of the transmitter may be assumed to be made up of a resistance $R_L$ and an inductive reactance $jx_L$ also as indicated in 14C. The net reactance, therefore of the load $$x_0 = x_L - x_m$$

In order to balance out in the other branches of the Y a similar $x_0$ must be used so that therefore the reactance $$x_2 + x_m = x_0 + \frac{R_0}{\sqrt{3}}$$

and $$x_1 + x_m = x_0 - \frac{R_0}{\sqrt{3}}$$

By making the $x_0$ in the three branches of the Y similar and equal, they may be ignored. $R_0$ in the present instance must equal $R_L - R_1$ and also $R_L - R_2$ so that the $R_1$ and $R_2$ in the lower branches of the Y may be balanced out. Equal impedances may be removed from each branch of a Y without unbalancing the network and therefore the $x_0$'s and $R_1$ and $R_2$ may be eliminated. If these conditions are adopted, the diagram in 14C becomes the equivalent of 14B and therefore the impedances of the phases are equal. In the design of the auto transformer it will be noted that one branch will have a reactance of $$x_0 + \frac{R_0}{\sqrt{3}}$$

while the other branch will have a reactance of $$x_0 - \frac{R_0}{\sqrt{3}}$$

The reactance of the first branch will be therefore considerably greater than that of the second branch although the resistances are to be the same. This may be accomplished by winding the smaller reactance with finer wire and the larger reactance with coarser wire so as to provide the greater length of wire necessary to give the greater reactance a resistance equivalent to the resistance of the smaller reactance.

In the operation of the system the multiphase power is generated by the tube circuit shown in the lower part of Fig. 1 and the so-called polygon transformer in the upper part of the figure. The groups of three brushes 90, 91 and 92, indicated in Fig. 6, bear upon the contact points indicated by a, b and c in Fig. 1, each group forming for itself an equilateral triangle. The switch shown in Figs. 6, 7, 8 and 9 is used to advance progressively the position of these groups of brushes so that as the switch is rotated, the groups begin to spread out in a fan shape drawing power in differing phases from the transformer. Each vertical group shown in Fig. 5 will, therefore, be provided with a different phase. For projection of a beam normal to the plane of the group of receivers all the units will have power presented in the same phase. As the beam, however, is to be swung to the right or left, the phase will be changed commencing from the vertical groups at one end to the vertical groups at the other extreme end. With a uniform spacing of groups the last group will be retarded or advanced in phase $n-1$ times the retardation or advance between a single unit where $n$ is the number of units. The beam can in this manner be swept over the entire horizontal field, the only limit being the boundary limits provided by the surface of the vessel.

In Figs. 15 and 16 there is shown a further application of the present invention. It is well known that synchronous motors are limited in their utility chiefly because it is practically impossible to vary their speed and also because it is difficult to start them. A synchronous motor is usually started as an induction motor or by some other means and the speed of the synchronous motor is determined when the frequency and the number of poles on the motor are fixed. Synchronous motors are, therefore, rarely run at other than a definite constant speed. There are, however, certain advantages in the use of synchronous motors which would make their use highly desirable if the speed and the starting could be easily controlled. In accordance with the application shown in Figs. 15 and 16 this is accomplished in the present invention.

In Fig. 15 the contacts a, b and c on the plate 200 correspond to the contacts a, b and c shown in Figs. 1 and 13. Mounted concentric with the plate 200 is a shaft 201 which is adapted to rotate in the bearing 202 in the plate and carries at one end a switch arm 203 and at the other end a pulley 204 driven by the adjustable speed motor 205 which may be controlled by the rheostat 206. The switch arm 203 has three arms 207, 208 and 209 each of which carries two brushes 210, 211, 212, 213, 214 and 215. The brushes 210 to 215, inclusive, are arranged substantially at the corners of an equilateral triangle and as indicated in Fig. 15 they may rest upon one segment or on successive segments, but no single brush may span two segments.

A group of conductive rings 216, 217, 218, 219, 220 and 221 are also mounted on the plate 200 concentric with the shaft 201. The rings 216 and 217 are continually connected with the brushes 210 and 211, respectively, while the brushes 212 and 213 and 214 and 215 are similarly connected with the rings 218 and 219 and 220 and 221. These rings are connected in pairs to the three-phase transformer 222, or if desired to three separate transformers, the ends of the winding 223 being connected to the inner two rings, the winding 224 to the middle two rings and the winding 225 to the outer two rings. The mid point of each of the three windings is connected to each phase of the synchronous motor 226.

In the operation of the system it will be noted that in any position of the switch arm 203 three-phase current is always being supplied to the synchronous motor 226. If the arm 203 is stationary, it seems quite obvious that the frequency of the current supplied to the motor is the frequency that is supplied to the polygon transformer indicated in Fig. 1. This, for instance, may be sixty cycles. If, however, the arm 203 is rotated in the same direction as the rotation of the phase, the frequency supplied to the synchronous motor 226 will be reduced, and if the arm should be rotated one revolution per second, a sixty-cycle supply would be reduced to fifty-nine cycles. By rotating, therefore, the arm 203 sixty revolutions per second, the frequency supplied would be zero. In starting the motor, therefore, the switch arm 203 is brought up to the speed such that the frequency supplied to the synchronous motor is practically zero; or, in other words, such that the phase rotation in the stator of the motor is very slow. The rotor under these circumstances can be slowly started and its speed can be increased as the speed of the switch arm 203 is diminished until the motor 226 will be operating directly through the supply when the switch arm 203 has come to rest.

In order to prevent the short circuiting of two adjacent segments and at the same time to have the motor permanently supplied with power a double group of brushes are used in conjunction with the three transformer windings 223, 224 and 225.

It should also be noted that not only is the apparatus described in connection with Figs. 15 and 16 applicable to starting of synchronous motors, but it is also applicable to changing their speeds. This application seems quite obvious since, for any rotation in the direction of the rotation of the phases of the arm 203, the frequency supplied to the motor will be reduced and therefore the motor speed would be materially reduced. This, however, does not affect the motor torque which can be maintained at uniformly high value so as to enable proper starting under load conditions.

The present system finds a material application in the starting and stopping of electric railway motors where up to the present time it has been very difficult to use synchronous motors and alternating current transmission under the most favorable conditions.

The use of the system will be readily understood. It may be used for signal communication and by the substitution of antennae for sound or compressional wave emitters the same system may be employed for radio transmission.

The system also finds application in the detection of submerged objects and in horizontal sound ranging for the determination of submerged objects or sound ranging a distance from the coast where reflections are desired from the coast itself.

The system may also be used for obtaining reflections from objects such as ships or rocks and may therefore be used to prevent collision in a state of fog.

The system may also be applied to aircraft ranging either for searching for aircrafts or for an aid in navigating the aircraft itself either by the use of the system in radiating sound or supersonic waves or radio waves, and similarly also the system can be employed for determining directions of objects and the location of objects by reflected radio beam.

Having now described my invention, I claim:

1. In a system for producing a controllable beam of radiated wave energy, a beam radiator, a power distribution source having terminal taps with voltage phases between taps forming a voltage vector diagram of substantially a regular polygon, a plurality of loads formed with branches having input terminals symmetrically connected about the terminal taps of the power distribution source, said loads comprising in one branch the load of the beam radiator and in the other branches loads each 120 degrees out of phase with the first load and each other.

2. In a system for producing a controllable beam of radiated compressional wave energy including a plurality of vertically arranged wave-producing groups having radiated surfaces spaced apart not more than one-half wave length of the wave to be emitted in the propagating medium and having a vertical dimension of a number of wave lengths, means for energizing each group with a progressive phase displacement proportional to the spacing, the plurality of groups occupying sufficient wave lengths to produce a vertically concentrated beam.

3. In a system for producing a controllable beam of radiated wave energy, a power distribution source adapted to produce voltages of phases forming a substantially regular polygon at points of terminal connections, a plurality of three-phase loads each having terminal connections and means for spacing said terminal connections symmetrically about the terminals of the power source and means for progressively varying the position of said load terminals with each other, said means maintaining the successive spacing between successive loads equal.

4. In a system for producing a controllable beam of radiated wave energy, a power distribution source adapted to produce voltages of phases forming a substantially regular polygon at points of terminal connections, a plurality of three-phase loads each having terminal connections and means for spacing said terminal connections symmetrically about the terminals of the power source, means for progressively varying the position of said load terminals with each other, said last-named means maintaining the successive spacing between successive loads equal, said three-phase loads including in one phase a group of transmitters or receivers and in the other phases electrical constants symmetrically balancing the transmitting or receiving load.

5. In a system for producing a controllable beam of radiated wave energy, a power distribution source having means for producing a plurality of voltages, each having vectors forming a voltage vector diagram of substantially a regular polygon and means for energizing a beam radiator comprising a three-phase source having three terminals adapted to be symmetrically placed about the power distribution source, one of said three phases being the beam radiator itself.

6. In a system for producing a controllable beam of radiated wave energy, a power distribution source having means for producing a plurality of voltages, each having vectors forming a voltage vector diagram of substantially a regular polygon and means for energizing a beam radiator comprising a three-phase source having three terminals adapted to be symmetrically placed about the power distribution source, one of said three phases containing the beam radiator itself.

7. In a system for producing a controllable beam of radiated wave energy, a beam radiator, a power distribution source having terminal taps with voltage phases between taps forming a voltage vector diagram of substantially a regular polygon and a plurality of three-phase loads formed with terminals symmetrically positioned with respect to the voltages of the power distribution source, each of said loads having means for producing the same power load on all phases of the power distribution source.

8. In a system for producing a controllable beam of radiated wave energy, a beam radiator, a power distribution source having terminal taps with voltage phases between taps forming a voltage vector diagram of substantially a regular polygon, a plurality of three-phase loads, means for connecting said loads to said power distribution source with each load advanced from the preceding load in the same phase displacement, said loads each having in one branch the beam radiator and in the other branches loads symmetrically positioned 120 degrees out of phase with the first load.

9. In a system for producing a controllable beam of radiated compressional wave energy including a plurality of vertically arranged wave-producing groups having surfaces spaced apart not more than one-half wave length of the wave to be emitted in the propagating medium and having vertical dimensions of a number of wave lengths and means for energizing each of said groups with voltages having different phases.

10. In a system for producing a controllable beam of radiated wave energy, a power distribution source comprising a three-phase primary system and a three-phase secondary system, said secondary system having a plurality of taps providing forward and reversed phases and sectioning off the secondary system in uniform groups of turns and means connecting said sections in series to produce a voltage distribution source having a vector voltage diagram of substantially a regular polygon.

LAURENCE BATCHELDER.